(12) United States Patent
Uchida et al.

(10) Patent No.: US 7,642,334 B2
(45) Date of Patent: Jan. 5, 2010

(54) POLYMER OF POLYCARBONATE DIOL HAVING AN ALICYCLIC STRUCTURE AND PRODUCTION PROCESS THEREOF

(75) Inventors: Hiroshi Uchida, Kawasaki (JP); Ritsuko Hirakawa, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 91 days.

(21) Appl. No.: 11/910,822

(22) PCT Filed: Apr. 5, 2006

(86) PCT No.: PCT/JP2006/307690

§ 371 (c)(1),
(2), (4) Date: Oct. 5, 2007

(87) PCT Pub. No.: WO2006/109816

PCT Pub. Date: Oct. 19, 2006

(65) Prior Publication Data

US 2009/0030242 A1   Jan. 29, 2009

Related U.S. Application Data

(60) Provisional application No. 60/671,058, filed on Apr. 14, 2005.

(30) Foreign Application Priority Data

Apr. 6, 2005   (JP) ............................. 2005-109461

(51) Int. Cl.
   *C08G 63/02*   (2006.01)
   *C08G 64/00*   (2006.01)

(52) U.S. Cl. ...................................... 528/195; 196/198

(58) Field of Classification Search .................. 528/196, 528/198, 195
See application file for complete search history.

(56) References Cited

U.S. PATENT DOCUMENTS 6,348,559 B1 *   2/2002   Fujimori et al. ............. 528/196

FOREIGN PATENT DOCUMENTS

| EP | 1018528 A2 | 7/2000 |
|----|------------|--------|
| EP | 1065231 A2 | 1/2001 |

\* cited by examiner

*Primary Examiner*—Jafar Parsa
(74) *Attorney, Agent, or Firm*—Sughrue Mion, PLLC

(57) ABSTRACT

The invention relates to a polycarbonate diol, comprising an organic residue derived from a diol component represented by formula (1),

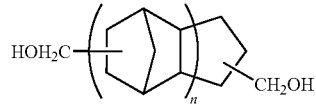

wherein n is 0 or an integer of 1 to 4, and the norbornane structure or the cyclopentane structure may be substituted with a halogen group or a hydrocarbon group.

The polycarbonate diol according to the present invention can give a polyurethane resin having excellent heat resistance and flexibility in a well-balanced manner and reliability in long-term insulating properties under high temperature/high humidity conditions.

10 Claims, No Drawings

POLYMER OF POLYCARBONATE DIOL HAVING AN ALICYCLIC STRUCTURE AND PRODUCTION PROCESS THEREOF

CROSS-REFERENCE TO RELATED APPLICATIONS

This is an application filed pursuant to 35 U.S.C. Section 111(a) with claiming the benefit of U.S. provisional application Ser. No. 60/671,058 filed Apr. 14, 2005 under the provision of 35 U.S.C. 111(b), pursuant to 35 U.S.C. Section 119(e) (1).

TECHNICAL FIELD

The present invention relates to a polymer of polycarbonate diol having as a diol component a diol including specific alicyclic structure, more specifically the invention relates to a polymer of polycarbonate diol which has as a diol component, an organic residue derived from a diol component as represented by formula (1)

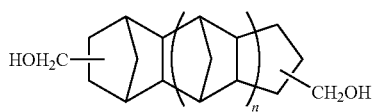

(in the formula, n is 0 or an integer of 1 to 4) and which has high electrical insulating properties and heat resistance and to a production method thereof.

BACKGROUND ART

Polycarbonate diol is used as a material for reacting with an isocyanate compound to thereby produce a polyurethane. Polycarbonate diol is prepared by using diol components such as 1,4-butanediol, 1,5-pentanediol, 3-methyl-1,5-pentanediol, 1,6-hexanediol, 2-methyl-1,8-octanediol, 1,9-nonanediol and 1,4-cyclohexanedimethanol. It is known that a polycarbonate diol obtained from a diol of a chain aliphatic compound reacts with an isocyanate compound to thereby produce a flexible polyurethane which is excellent in water resistance, and that a polycarbonate diol obtained from cyclohexane dimethanol reacts with an isocyanate compound to produce a rigid polyurethane.

However, in polyurethanes obtained from these polycarbonate diols, flexibility and heat resistance are not well balanced and a flexible polyurethane has a poor heat resistance while a rigid polyurethane, which has a heat resistance, not only has a defect of poor flexibility, but also involves a disadvantage of low reliability in long-term insulating performance due to its high hygroscopic property under high temperature/high humidity conditions since it contains a high proportion of urethane bonds.

DISCLOSURE OF THE INVENTION

Accordingly, the object of the present invention is to provide polymer of polycarbonate diol, which enables production of a polyurethane having flexibility and heat resistance in a well-balanced manner and highly reliable in long-term insulating performance under high temperature/high humidity conditions, through reaction between the polymer and an isocyanate compound.

As a result of intensive studies, the present inventors have found as raw material compound a polycarbonate diol containing a diol compound having a specific alicyclic structure which is expected to enable production of a polyurethane having flexibility and heat resistance in a well-balanced manner and highly reliable in long-term insulating performance under high temperature/high humidity conditions, and thereby have completed the invention.

That is, the present invention relates to a polycarbonate diol and a production method thereof, as follows.

1. A polycarbonate diol, comprising an organic residue derived from a diol component represented by formula (1).

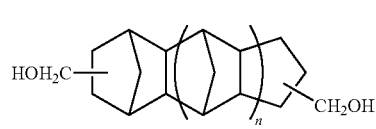

(in the formula, n is 0 or an integer of 1 to 4, and the norbornane structure or the cyclopentane structure may be substituted with a halogen group or a hydrocarbon group.)

2. The polycarbonate diol as described in 1 above, wherein the diol component of formula (1) is contained at 5 mol % or more with respect to the other diol components.

3. The polycarbonate diol as described in 1 or 2 above, wherein the diol component is tricyclodecane dimethanol and/or pentacyclopentadecane dimethanol.

4. The polycarbonate diol as described in 3 above, wherein the tricyclodecane dimethanol is represented by formula (2).

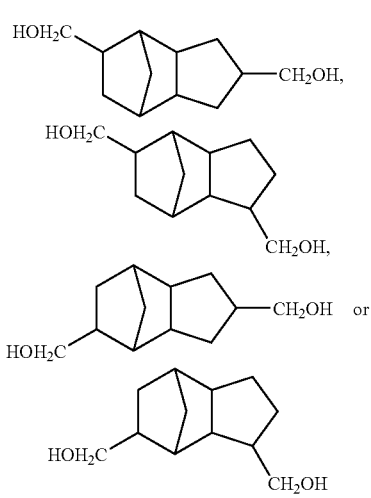

5. The polycarbonate diol as described in 3 above, wherein the pentacyclopentadecane dimethanol is represented by formula (3).

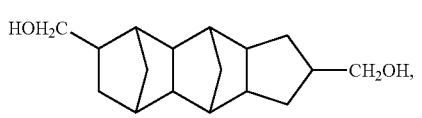

-continued

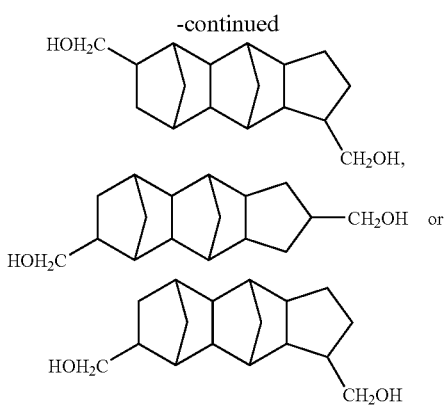

6. A production method of polycarbonate diol having an organic residue derived from the diol component represented by formula (1), wherein the diol component represented by formula (1) as described in 1 above and if necessary other diol components are subjected to transesterification reaction with carbonic acid ester in the presence of an transesterification catalyst.

7. A production method of polycarbonate diol having an organic residue derived from the diol component represented by formula (1), wherein the diol component represented by formula (1) as described in 1 above and if necessary other diol components are subjected to reaction with phosgene.

The polymer of polycarbonate diol according to the present invention, which gives a polyurethane compound having an excellent balance between flexibility and heat resistance and an excellent reliability in long-term insulating performance under high temperature/high humidity conditions through reaction with an isocyanate compound, is expected to be applicable to insulating films or the like in electronic/electric materials.

BEST MODE FOR CARRYING OUT THE INVENTION

The polycarbonate diol of the present invention comprises an organic residue derived from a diol component represented by formula (1).

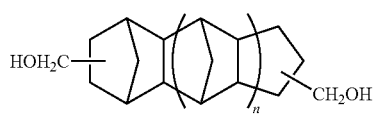 (1)

In the formula, n is 0 or an integer of 1 to 4, preferably 0 or an integer of 1 to 2, more preferably 0 or 1. The norbornane structure and the cyclopentane structure may be substituted with one or more halogen atoms or hydrocarbon groups respectively. The hydrocarbon group is preferably an aliphatic hydrocarbon group such as an alkyl group and an alkenyl group, more preferably an alkyl or alkenyl group having 1 to 12 carbon atoms, still more preferably an alkyl group having 1 to 6 carbon atoms or an or alkenyl group having 2 to 6 carbon atoms. Specific examples thereof include a methyl group, an ethyl group, a propyl group, a butyl group, a pentyl group, a hexyl group, a vinyl group and an allyl group. These may be linear or branched chain. Examples of halogen atom include a chlorine atom, a bromine atom and an iodine atom.

In the present invention, "an organic residue derived from a diol component" means a structure where hydrogen is removed from at least one terminal —CH$_2$OH group in the above formula (1).

Specific examples of compound of formula (1) include tricyclodecane dimethanol represented by formula (2) and pentacyclopentadecane dimethanol represented by formula (3).

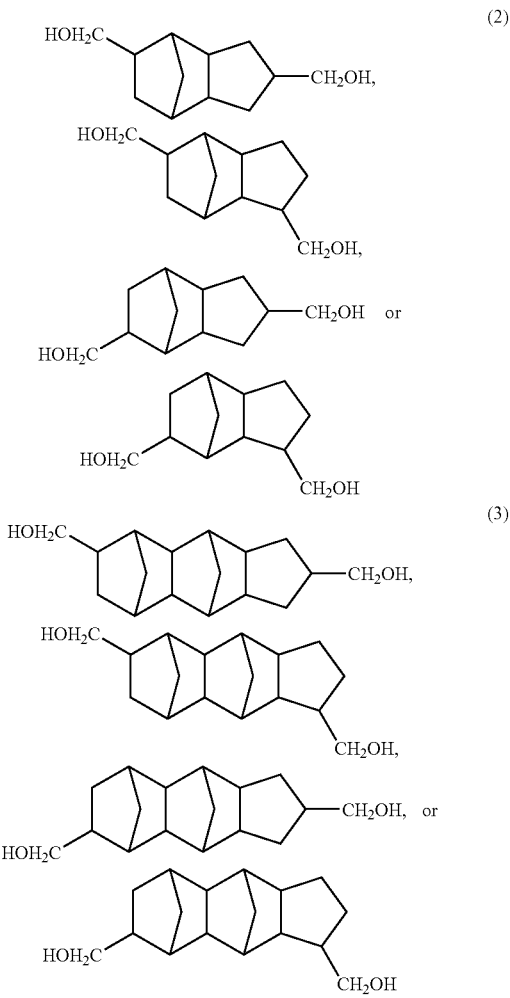

The polycarbonate diol of the present invention can be produced by subjecting a diol component having a specific structure represented by formula (1) with carbonic acid ester in the presence of an transesterification catalyst. In the reaction, other diol components may be present.

Examples of other diols used herein include dihydroxy compounds having a relatively low molecular weight such as ethylene glycol, diethylene glycol, propylene glycol, 1,4-butanediol, 1,3-butanediol, 1,5-pentanediol, neopentyl glycol, 3-methyl-1,5-pentanediol, 1,6-hexanediol, 1,4-cyclohexanedimethanol, 2-methyl-1,8-octanediol, 1,9-nonanediol, hydroquinone, resorcin, bisphenol-A, bisphenol-F and 4,4'-biphenol and diol oligomers having a relatively high molecular weight such as polyether polyols such as polyethylene glycol, polypropylene glycol and polytetramethylene glycol, polyester polyols such as polyhexamethylene adipate, polyhexamethylene succinate and polycaprolactone, and polycarbonate diols such as polyhexamethylene carbonate.

In order to express reliability in long-term insulating performance under high temperature/high humidity conditions, it is necessary that the diol of formula (1) is used in an amount of 5 mol % or more, preferably at 40 mol % or more based on the total amount of all the diol components.

Examples of carbonic acid ester used in the invention include dialkyl carbonate (dimethyl carbonate, diethyl carbonate or the like), diaryl carbonate (diphenyl carbonate or the like) and alkylene carbonate (ethylene carbonate or the like). In a case where a suitable diol is reacted with a carbonic acid ester, it is preferred in terms of the reaction rate to use a single kind of transesterification catalyst or multiple kinds of transesterification catalysts in an amount of 0.001 to 0.1 mass %, preferably 0.001 to 0.01 mass % based on the amount of the diol.

Preferred examples of catalyst used in synthesis of the polycarbonate diol of the present invention include catalysts (transesterification catalysts) usually employed in transesterification reaction. Specific examples thereof include alkali metal compounds such as hydroxides of alkali metals (lithium hydroxide, sodium hydroxide, potassium hydroxide and the like), carbonates of alkali metals (lithium carbonate, sodium carbonate, potassium carbonate and the like), carboxylic salts of alkali metals (lithium acetate, sodium acetate, potassium acetate and the like) and alkali metal alkoxides (lithium alkoxide, lithium methoxide, sodium methoxide, potassium t-butoxide and the like), alkali earth metal compounds such as hydroxides of alkali earth metals (magnesium hydroxide and the like), alkali earth metal alkoxide (magnesium methoxide and the like), aluminum compounds such as aluminum alkoxides (aluminum ethoxide, aluminum isopropoxide, aluminum s-butoxide and the like) and aluminum acetylacetonate, zinc compounds such as carboxylic salts of zinc (zinc acetate and the like) and zinc acetylacetonate, manganese compounds such as carboxylic salts of manganese (manganese acetate and the like) and manganese acetylacetonate, nickel compounds such as carboxylic salts of nickel (nickel acetate and the like) and nickel acetylacetonate, antimony compounds such as carboxylic salts of antimony (antimony acetate and the like) and antimony alkoxide, zirconium compounds such as zirconium alkoxides (zirconium propoxide, zirconium butoxide and the like) and zirconium acetylacetonate, titanium compounds such as titanium alkoxides (tetraethoxy titanium, tetraisopropoxy titanium, tetrabutoxy titanium and the like) and organic tin compounds (dibutyl tin oxide, dibutyl tin diacetate, dibutyl tin dilaurate and the like). As carboxylic salts, preferred are those having 2 to 30 carbon atoms and as alkoxides, those having an alkoxy group having 1 to 30 carbon atoms are preferred.

Among these catalysts, titanium compounds and organic tin compounds are preferred. Particularly preferred are titanium alkoxides (such as tetraethoxy titanium, tetraisopropoxy titanium and tetrabutoxy titanium). Among the titanium alkoxides, and tetrabutoxy titanium is most preferred.

The transesterification reaction temperature is preferably from 50 to 300° C., particularly preferably from 80 to 250° C. The reaction pressure may be normal pressure. If necessary, the reaction pressure may be increased or reduced. Moreover, although the reaction can proceed in air, it is more advantageous in consideration of the problem of coloring to conduct the reaction in an inert gas atmosphere such as nitrogen, argon or helium.

It is preferable to carry out the reaction while distilling off alcohols generated in the reaction. However, in a case where dimethyl carbonate is used, azeotropy of dimethyl carbonate and methanol generated may be caused to thereby remove the dimethyl carbonate together with methanol. In such a case, it is preferable to add dimethyl carbonate to make up for the dimethyl carbonate after distilled off in azeotropy with methanol or to use an extra amount of dimethyl carbonate at the beginning of the reaction to allow a wide margin for the amount to be distilled off.

The average molecular weight (number average molecular weight) of the polymer of polycarbonate diol obtained in this method can be controlled by adjusting the molar ratio of materials used. A copolymer of polycarbonate diol generated can be obtained by cooling the reaction liquid after the reaction.

In a case where the average molecular weight of the thus obtained polymer of polycarbonate diol is smaller than the desired molecular weight, further reaction may be conducted by adding carbonic acid ester compound as appropriate while in a case where the average molecular weight is larger than the desired molecular weight, further transesterification reaction may be conducted by adding a diol compound, to thereby control a desired molecular weight of the polymer of polycarbonate diol.

The polycarbonate diol polymer of the present invention can be produced by subjecting a diol having a specific structure of formula (1) or if necessary a mixture of the diol and other diols to reaction with phosgene. Examples of other diol components usable here and the preferable ratio for blending the diols are the same as described above.

In a case where reaction is conducted with phosgene, hydrochloric acid is generated and therefore, for the purpose of enhancing the reaction rate and preventing corrosion of the reaction apparatus, reaction may be performed in the presence of an appropriate solvent and in the presence of a trapping agent. As the trapping agent, a tertiary amine compound such as triethylamine or tributylamine is generally employed.

In consideration for washing with water to be conducted after the reaction, as the solvent, those insoluble in water are preferred and examples of the solvent include aromatic hydrocarbons such as benzene, toluene and xylene, ether compounds such as diethylether, diisopropylether and dibutylether, and halogen-based hydrocarbons such as chloroform and methylene chloride.

The reaction temperature is preferably from −20 to 150° C., particularly preferably 0 to 120° C. In such a case, the molecular weight of the obtained polycarbonate diol can be controlled by adjusting the molar ratios of the raw material diol compound and phosgene.

In a case where the polymer of the polycarbonate diol contains an transesterification catalyst, it is preferred that the polymer be subjected to heat treatment with addition of an appropriate treating agent such as triester phosphite to thereby deactivate the activity of the transesterification catalyst.

The thus obtained copolymer of polycarbonate diol according to the present invention preferably has a number average molecular weight of 300 to 50,000, preferably 500 to 5,000 as a raw material employed in production of polyurethane. The reaction with an isocyanate compound may be conducted by using for example, diphenylmethane diisocyanate, hydrogenerated diphenylmethane diisocyanate, isophorone diisocyanate and dicyclohexylmethane diisocyanate according to conventionally known method.

EXAMPLES

Hereinafter, the present invention is specifically described with reference to Examples, however, the present invention is by no means limited to the following Examples.

Example 1

In a reaction vessel equipped with a stirrer, thermometer and fractionating column, 785.2 g (4.00 mol) of tricyclodecane methanol, 360.32 g (4.00 mol) of dimethyl carbonate and 520 mg of tetra-n-ethoxytitanium were placed and reaction was conducted at a temperature of 90 to 140° C. while distilling off methanol by-produced in the reaction. After distillation of the methanol was almost completed, the reaction was continued for further 8 hours under a pressure reduced to 10 mmHg or less. The reaction was conducted in a nitrogen atmosphere.

After completion of the reaction, the reaction liquid was cooled and a pale yellow solid was obtained at room temperature. The product was confirmed to be a polymer of polycarbonate diol by GPC and NMR analyses. The number average molecular weight of the product was 824.

Example 2

In a reaction vessel equipped with a stirrer, thermometer and fractionating column, 1049.56 g (4.00 mol) of pentacyclopentadecane dimethanol (manufactured by MARUZEN PETROCHEMICAL CO., LTD.), 360.32 g (4.00 mol) of dimethyl carbonate and 520 mg of tetra-n-ethoxytitanium were placed and reaction was conducted at a temperature of 90 to 140° C. while distilling off methanol by-produced in the reaction. After distillation of the methanol was almost completed, the reaction was continued for further 8 hours under a pressure reduced to 10 mmHg or less. The reaction was conducted in a nitrogen atmosphere.

After completion of the reaction, the reaction liquid was cooled and a colorless transparent liquid was obtained at room temperature. The product was confirmed to be a polymer of polycarbonate diol by GPC and NMR analyses. The number average molecular weight of the product was 1823.

Example 3

In a reaction vessel equipped with a stirrer, thermometer and fractionating column, 392.6 g (2.00 mol) of tricyclodecane dimethanol, 236.36 g (2.00 mol) of 1,6-hexanediol, 360.32 g (4.00 mol) of dimethyl carbonate and 40 mg of tetra-n-ethoxytitanium were placed and reaction was conducted at a temperature of 95 to 160° C. while distilling off methanol by-produced in the reaction. After distillation of the methanol was almost completed, the reaction was continued for further 4 hours under a pressure reduced to 10 mmHg or less. The reaction was conducted in a nitrogen atmosphere.

After completion of the reaction, the reaction liquid was cooled and a colorless transparent liquid was obtained at room temperature. The product was confirmed to be a polymer of polycarbonate diol by GPC and NMR analyses. The number average molecular weight of the product was 2390.

Example 4

In a reaction container equipped with a stirrer, thermometer and fractionating column, 392.6 g (2.00 mol) of tricyclodecane dimethanol, 288.44 g (2.00 mol) of 1,4-cyclohexanedimethanol, 360.32 g (4.00 mol) of dimethyl carbonate and 40 mg of tetra-n-ethoxytitanium were placed and reaction was conducted at a temperature of 95 to 160° C. while distilling off methanol by-produced in the reaction. After distillation of the methanol was almost completed, the reaction was continued for further 4 hours under a pressure reduced to 10 mmHg or less. The reaction was conducted in a nitrogen atmosphere.

After completion of the reaction, the reaction liquid was cooled and a colorless transparent liquid was obtained at room temperature. The product was confirmed to be a polymer of polycarbonate diol by GPC and NMR analyses. The number average molecular weight of the product was 1762.

INDUSTRIAL APPLICABILITY

According to the present invention, by reacting polycarbonate diol synthesized with a diol component having a specific skeleton with a diisocyanate compound, a resin composition having excellent heat resistance, flexibility and reliability in long-term insulating properties under high temperature/high humidity conditions can be produced.

The invention claimed is:

1. A polycarbonate diol, comprising an organic residue derived from at least a diol component represented by formula (1),

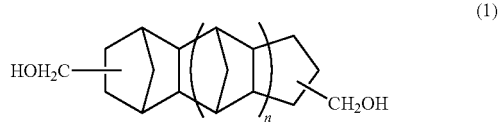

(1)

wherein n is 0 or an integer of 1 to 4, and the norbornane structure or the cyclopentane structure may be substituted with a halogen group or a hydrocarbon group,
wherein the polycarbonate diol has an average number molecular weight of 500 to 5,000.

2. The polycarbonate diol as claimed in claim 1, wherein the diol component of formula (1) is contained at 5 mol % or more based on the amount of all of the diol components.

3. The polycarbonate diol as claimed in claim 1, wherein the diol component is tricyclodecane dimethanol and/or pentacyclopentadecane dimethanol.

4. The polycarbonate diol as claimed in claim 3, wherein the tricyclodecane dimethanol is represented by formula (2):

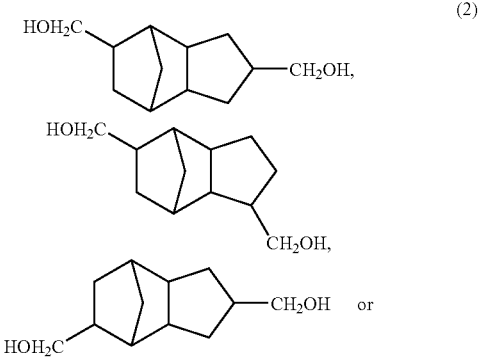

(2)

-continued

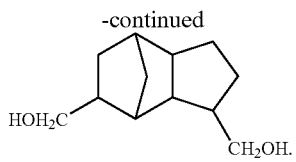

5. The polycarbonate diol as claimed in claim 3, wherein the pentacyclopentadecane dimethanol is represented by formula (3):

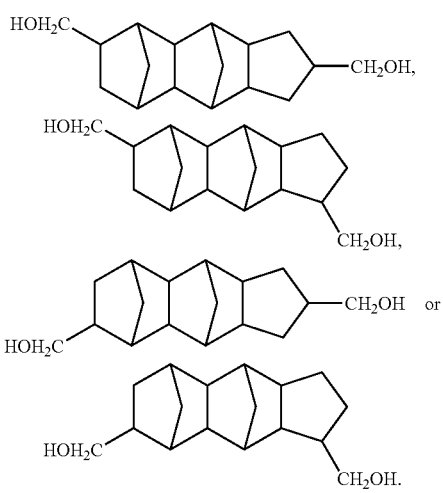

(3)

6. A production method of polycarbonate diol having an organic residue derived from the diol component represented by formula (1), wherein at least the diol component represented by formula (1) as described in claim 1 is subjected to transesterification reaction with carbonic acid ester in the presence of an transesterification catalyst.

7. A production method of polycarbonate diol having an organic residue derived from the diol component represented by formula (1), wherein at least the diol component represented by formula (1) as described in claim 1 is subjected to reaction with phosgene.

8. The polycarbonate diol as claimed in claim 2, wherein the diol component is tricyclodecane dimethanol and/or pentacyclopentadecane dimethanol.

9. The polycarbonate diol as claimed in claim 8, wherein the tricyclodecane dimethanol is represented by formula (2):

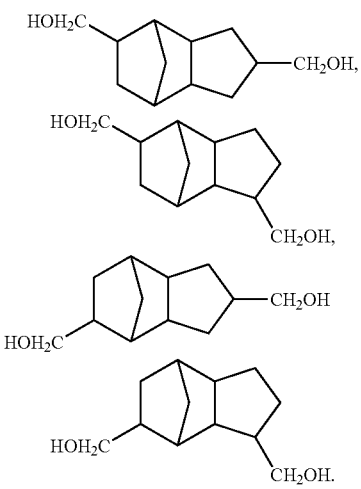

(2)

10. The polycarbonate diol as claimed in claim 8, wherein the pentacyclopentadecane dimethanol is represented by formula (3):

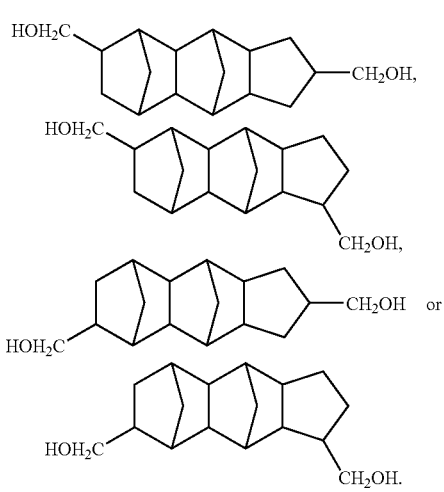

(3)

* * * * *